(12) United States Patent
Chakraborty et al.

(10) Patent No.: US 9,846,633 B2
(45) Date of Patent: Dec. 19, 2017

(54) GENERATING TESTS FOR TESTING SOFTWARE APPLICATIONS

(71) Applicant: CA, Inc., New York, NY (US)

(72) Inventors: Saugata Chakraborty, Bengaluru (IN); Sudip Mitra, Karnataka (IN); Swapnel Shrivastava, Karnataka (IN)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/876,375

(22) Filed: Oct. 6, 2015

(65) Prior Publication Data

US 2017/0097882 A1    Apr. 6, 2017

(51) Int. Cl.
    *G06F 9/44*         (2006.01)
    *G06F 11/36*      (2006.01)

(52) U.S. Cl.
    CPC ...... *G06F 11/3684* (2013.01); *G06F 11/3688* (2013.01)

(58) Field of Classification Search
    CPC . G06F 11/368; G06F 11/3684; G06F 11/3688
    See application file for complete search history.

(56) References Cited

U.S. PATENT DOCUMENTS

| | | | | |
|---|---|---|---|---|
| 5,513,315 | A * | 4/1996 | Tierney | G06F 11/3688 714/10 |
| 8,429,459 | B2 * | 4/2013 | Birakoglu | G06F 11/368 714/38.1 |
| 2013/0311976 | A1 * | 11/2013 | Bhat | G06F 11/3684 717/130 |
| 2016/0224455 | A1 * | 8/2016 | Sekiguchi | G06F 11/3612 |

* cited by examiner

*Primary Examiner* — Camquy Truong
(74) *Attorney, Agent, or Firm* — Coats & Bennett, PLLC

(57) ABSTRACT

A multi-staged method is disclosed in which a computing device generates tests to execute on an application program. The tests that are generated do not supplant or replace other types of testing typically executed on an application program, but rather, are generated based on the results of those tests and are intended to complement those tests. The multi-stage method particularly captures and stores information related to the tests as those tests are executed on the application program, verifies the data and parameters associated with the tests, and then generates a set of supplementary tests to test the application program responsive to receiving a notification message indicating that the program code of the application program has been changed.

23 Claims, 8 Drawing Sheets

```
long calculate (String expression) // where expression = "1 +3" for example
  ->long strToLong(String)                (sub method 1)
  ->long add(long,long)                   (sub method 2)
```

Initial Testing.
PASS: SimpleRecord [clazz=com.example.calculator.Calculator, method=calculate, args=[1+3], retVal=4, scenario=1+3]
PASS: SimpleRecord [clazz=com.example.calculator.Calculator, method=add, args=[1, 3], retVal=4, scenario=1+3]
PASS: SimpleRecord [clazz=com.example.calculator.Calculator, method=strToLong, args=[3], retVal=3, scenario=1+3]
PASS: SimpleRecord [clazz=com.example.calculator.Calculator, method=strToLong, args=[1], retVal=1, scenario=1+3]

Regression Testing
FAIL: SimpleRecord [clazz=com.example.calculator.Calculator, method=calculate, args=[1+3], retVal=4, scenario=1+3]
PASS: SimpleRecord [clazz=com.example.calculator.Calculator, method=add, args=[1, 3], retVal=4, scenario=1+3]
FAIL: SimpleRecord [clazz=com.example.calculator.Calculator, method=strToLong, args=[3], retVal=3, scenario=1+3]
FAIL: SimpleRecord [clazz=com.example.calculator.Calculator, method=strToLong, args=[1], retVal=1, scenario=1+3]

FIG. 4

SCENARIO Table

| FIELD NAME | DESCRIPTION |
|---|---|
| SCENARIO ID | A unique identifier that identifies a test scenario generated by the control computer |
| SCENARIO NAME | A name assigned to the test scenario |
| METHOD LIST | An array of Method IDs – each identifying a method invoked during a test. The Method IDs appear in the same sequence as they are actually invoked during the test |

FIG. 5A

TEST CASE Table

| FIELD NAME | DESCRIPTION |
|---|---|
| TEST CASE ID | A unique identifier that identifies a given test |
| SCENARIO ID | The ID of the scenario that the test is associated with |
| THREAD ID | Identifies a thread that invokes the method identified below by METHOD ID to handle multi-threaded applications |
| CALL STACK DEPTH | The depth of the call stack when the method identified by METHOD ID is invoked |
| INVOCATION TIME | The time that the method identified by METHOD ID is invoked (in nanoseconds) |
| RETURN TIME | The time that the method identified by METHOD ID finished executing (in nanoseconds). Together, with the INVOCATION TIME field, an elapsed time for the execution of the method identified by METHOD ID can be computed |
| METHOD ID | The unique identifier for the method. Used as a foreign key into the METHOD Table |
| VERIFIED | This parameter is determined (i.e., 'learned') during the verification stage 90, and indicates whether the method identified by METHOD ID has been verified |

FIG. 5B

METHOD Table

| FIELD NAME | DESCRIPTION |
|---|---|
| METHOD ID | The unique identifier for the method |
| CLASS ID | The name or identifier of the class of which the METHOD ID is a part |
| SIGNATURE | The computed signature of the method |
| EXCEPTION | Stores the value(s) of any exception that may be thrown by METHOD ID during the recording stage |
| RETURN VALUE | Stores the return values of the method. RETURN VALUE is a foreign key into the OBJECTS Table |

FIG. 5C

PARAMETERS Table

| FIELD NAME | DESCRIPTION |
|---|---|
| METHOD ID | Used as a foreign key into the METHOD Table |
| PARAMETER ID | Used as a foreign key into the OBJECTS Table |
| PARAMETER SEQ | An array of the parameters input into METHOD ID in sequence |

FIG. 5D

OBJECTS Table

| FIELD NAME | DESCRIPTION |
|---|---|
| NORMALIZED OBJECT ID | This is a unique identifier for an object in METHOD ID. It is generated during the normalization stage and used to identify and retrieve objects |
| COMPLETE FLAG | Optional. In some cases, it may not be possible to save complete objects in the database. Therefore, this field is a BOOLEAN value that indicates whether the complete object identified by OBJECT ID is saved |
| OBJECT TYPE | Identifies a data type for the object identified by OBJECT ID (e.g., int, string, bool, POJO, HTTPRequest, etc. |
| SAVED STATE | A string representation that may be used to re-create the object identified by OBJECT ID during the verification and/or the test generation stages |
| ORIGINAL OBJECT ID | The original identifier for the object. This value is useful if the return value for the method identified by METHOD ID is an input parameter to another method |

FIG. 5E

GENERATING TESTS FOR TESTING SOFTWARE APPLICATIONS

BACKGROUND

The present disclosure relates generally to computing devices, and more particularly to computing devices that generate tests to perform on software applications.

Application developers (and others) usually write unit tests before beginning development (e.g., as part of application design), as well as during development. However, there are real-world constraints that typically interfere with the developers creating such tests. For example, in most cases, personnel such as developers and testers do not create enough tests to fully exercise all the functions of the application program. Further, conventionally generated tests may not consider how the testing of one methods may affect processing performed by other methods in the application program. Additionally, there are usually situations where the code of a given method is altered after initial deployment, but the tests originally created to test that method are not updated to reflect those changes. Quality Assurance (QA) personnel normally have a larger and more "up-to-date" set of positive and negative test cases to cover all scenarios; however, this may not always be the case.

BRIEF SUMMARY

The present disclosure provides a method and apparatus for automatically generating tests for an application program based on the parameters and results of previous tests executed on the application program. In one embodiment, a computer-implemented method for performing embodiments of the present disclosure comprises identifying an application program under test, wherein the application program is associated with a plurality of methods, and wherein each method comprises program code configured to perform a corresponding function during execution of the application program. Responsive to detecting a test being executed on the application program, the method calls for recording test parameters associated with a method that is invoked during the test in a memory circuit. The method then generates a verification test based on the recorded test parameters, wherein the verification test is configured to invoke the method, and executes the verification test on the application program. The method then calls for verifying the recorded test parameters associated with the method based on data processed by the method invoked during the verification test, and generating a supplemental test based on the recorded test parameters that have been verified responsive to detecting a change made to code in the application program, wherein the supplemental test is configured to invoke the method of the application program.

In another embodiment, the present disclosure provides a computing device comprising a communications interface circuit and a processing circuit operatively connected to the communications interface circuit and a memory circuit. The communications interface circuit communicates with remote devices via a communications network. The processing circuit is configured to identify an application program under test, wherein the application program is associated with a plurality of methods, and wherein each method comprises program code configured to perform a corresponding function during execution of the application program. The processing circuit is further configured to record test parameters associated with a method that is invoked during the test responsive to detecting a test being executed on the application program. The processing circuit is then configured to generate a verification test based on the recorded test parameters, wherein the verification test is configured to invoke the method, and to execute the verification test on the application program. The processing circuit is also configured to verify the recorded test parameters associated with the method based on data processed by the method invoked during the verification test, and generate a supplemental test based on the recorded test parameters that have been verified responsive to detecting a change made to code in the application program, wherein the supplemental test is configured to invoke the method of the application program.

In another embodiment, the present disclosure provides a computer-readable storage medium comprising control instructions stored thereon that, when executed by a processing circuit of a computing device, control the computing device to perform the method of the present disclosure as a multi-stage method. Particularly, in a first stage, the control instructions control the computing device to identify an application program under test, wherein the application program is associated with a plurality of methods, and wherein each method comprises program code configured to perform a corresponding function during execution of the application program. The control instructions further control the computing device to record test parameters associated with a method that is invoked during the test responsive to detecting a test being executed on the application program.

In a second stage, the control instructions control the computing device to generate a verification test based on the recorded test parameters, wherein the verification test is configured to invoke the method, execute the verification test on the application program, and verify the recorded test parameters associated with the method based on data processed by the method invoked during the verification test.

In a third stage, the control instructions control the computing device to generate a supplemental test based on the recorded test parameters that have been verified responsive to detecting a change made to code in the application program, wherein the supplemental test is configured to invoke the method of the application program.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

FIG. 4 illustrates an exemplary output for the testing of an application program according to one embodiment of the present disclosure.

FIGS. 5A-5E illustrate a framework configured according to one embodiment of the present disclosure.

DETAILED DESCRIPTION

Figure 1:
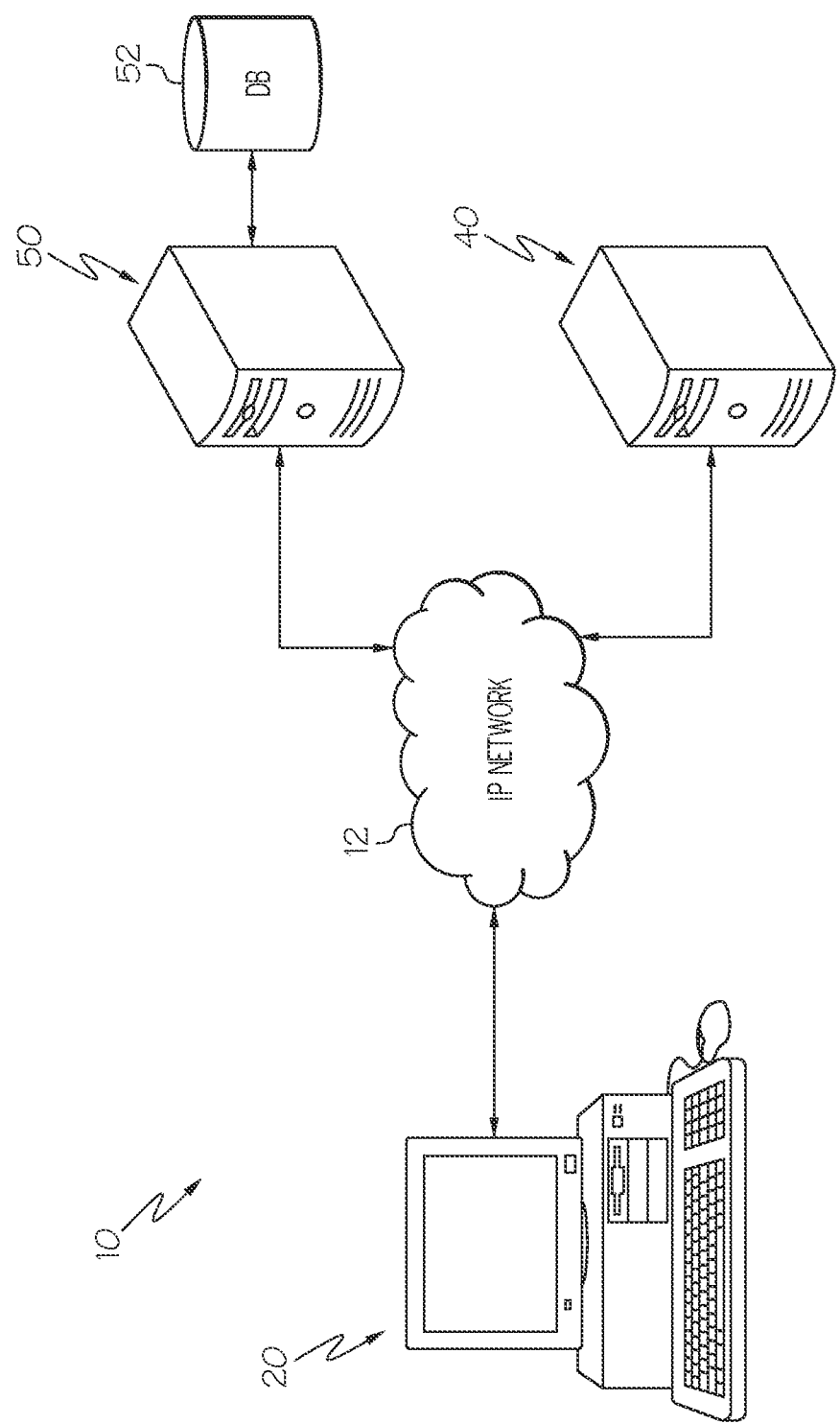
FIG. 1 is a block diagram illustrating a computer network configured according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, embodiments of the present disclosure provide a multi-stage framework through which one or more tests may be automatically generated for testing the functions of an application program. These tests (e.g., unit tests, integration tests, functional tests, system tests, etc.) may be generated during a Quality Assurance (QA) cycle for the application program, for example, and are generated based on the parameters and results associated with a set of tests already executed on the application program. Once generated, the tests are executed to verify the parameters and information associated with those test, and then stored in memory. Later, upon determining that the program code for the application program has been changed (e.g., whenever methods of the application program are added, removed, or modified), embodiments of the present disclosure uses the verified parameters and information to generate a set of supplementary tests to fully test the subsequent versions of the application program with a high degree of confidence.

Often times, changes made to the program code of a first method may affect the processing performed by the code of a second method—even though the program code of the second method is not changed. Such instances may occur, for example, when the code of an Application Programming Interface (API) used by the application program is changed. However, according to the present disclosure, the supplemental tests are generated to fully exercise the code of each method affected by such code changes even though the code of any one particular method may not have changed. Thus, the supplemental tests may be generated to invoke methods along one execution path through the application program (i.e., a path of execution through the application code in which methods are invoked in a predetermined order to perform their corresponding functions), or through multiple execution paths through the application program.

Additionally, it should be noted that the supplemental tests generated according to the present disclosure are not intended to replace the tests that are executed during the various forms of testing (e.g., unit testing, integration or functional testing, system testing, etc.). Rather, the supplementary tests generated according to the present disclosure are intended to be complementary to these previously executed tests.

Turning now to the drawings, FIG. 1 is a functional block diagram illustrating some components of a computer system 10 configured according to one embodiment of the present disclosure. As those of ordinary skill in the art will readily appreciate, the components of system 10 depicted in FIG. 1 are for illustrative purposes only. Thus, computer systems 10 that are suitable for configuration according to the present embodiments may comprise more or fewer components, or in some cases, components that are different than those illustrated in FIG. 1.

Additionally, it should be noted that the components illustrated in FIG. 1 are described in the context of QA testing in which the program code of an application program is new or has been modified. However, the mention of any specific type of testing or feature throughout the present disclosure is for illustrative purposes only. As those of ordinary skill in the art will readily appreciate, the present embodiments may be utilized to generate tests for supplementing other types of testing in addition to, or in lieu of, QA testing. Such testing includes, but is not limited to, developer testing, unit testing, integration testing, regression testing, and system testing.

As seen in FIG. 1, system 10 comprises an IP communications network 12 that communicatively interconnects a control computer 20, an application server (AS) 40, and a database (DB) server 50. Additionally, DB server 50 communicatively connects to a mass storage device DB 52. As described in more detail below, the DB server 50 and the mass storage device 52 may be used as a code repository to store the program code of one or more application programs. Such application programs typically comprise a plurality of inter-communicating, programmed procedures that perform specific functions while the application program is executing on a computing device. In some cases, such programmed procedures are part of an object class, and thus, are associated with an "object-oriented" application program (OOP), while in other cases the programmed procedures are simply part of a procedural application program. Those of ordinary skill in the art will recognize that one common term for such programmed procedures is "routines;" however, for ease of discussion, the present disclosure refers to such programmed procedures herein as "methods."

Generally, application programs undergoing QA testing execute on AS 40, although they may also execute on one or both of control computer 20 and DB server 50. As is known in the art, QA testing is intended to test each of the functions of the application program. To accomplish this, commands and parameters that implement predefined tests may be sent to the application program by a user via a Graphical User Interface (GUI) at control computer 20, or by a specially configured test program (e.g., a test script) executing on control computer 20. In some embodiments, the scripts for invoking the QA tests execute directly on the AS 40. Regardless of how the tests are initiated, however, the application program, upon receiving the commands and parameters associated with these tests, processes that data according to its programming to perform one or more functions.

Each test that is invoked on the application program during QA testing has associated input and/or output parameters. The input parameters comprise values of various types (e.g., pointers, records, strings, integers, float, etc.) that are input into the methods of the application program under test, and in some cases, are processed by those methods. The output parameters also comprise values of various types (e.g., pointers, records, strings, integers, float, etc.) that are output by the methods of the application program under test. According to embodiments of the present disclosure, the application program under test is specially configured to capture and report these parameters, as well as other test-related information, to the control computer 20. Subsequently, the control computer 20 generates verification tests to verify the parameters and test-related information captured during the QA tests, and stores the verified parameters and information in a memory. Once verified, the parameters and information will be used by the control computer 20 to automatically generate one or more supplemental tests for use in testing the application program whenever its program code changes.

In particular, the DB server 50 is used in various embodiments of the present disclosure as a code repository. Therefore, DB server 50 is aware of any changes that are made to the code of the application program. In response to detecting such changes, DB server 50 sends a notification message to control computer 20 indicating the code change. The notification messages may identify particular methods whose programming code was changed, added, or deleted from the application program, as well as carry other useful information. Responsive to receiving the notification messages, and as described in more detail below, the control computer 20 analyzes the verified parameters and information to automatically determine which supplemental tests need to be generated to fully test the application program, and then generates those tests.

As stated previously, control computer 20 is configured to generate the supplemental tests necessary to test each method affected by the detected code changes regardless of whether the code in that method was actually changed. In more detail, the methods of an application program will often times invoke other methods of the application program, and/or methods that are associated with an Application Programming Interface (API). Even though the program code of these other methods may not have been expressly changed or added, they may still be invoked by a method that has been changed, and thus, are possibly affected by the changed or added code. In conventional testing scenarios, only those methods whose program code is changed are tested (e.g., regression tested). Those methods whose program code is not changed are not normally tested, thereby leaving the full functionality of the application program with respect to these "unchanged" methods uncertain. According to the present disclosure, however, control computer 20 is configured to generate a number of supplemental tests to ensure that each method that may be affected by the changed or added code is also fully tested.

Figure 2:
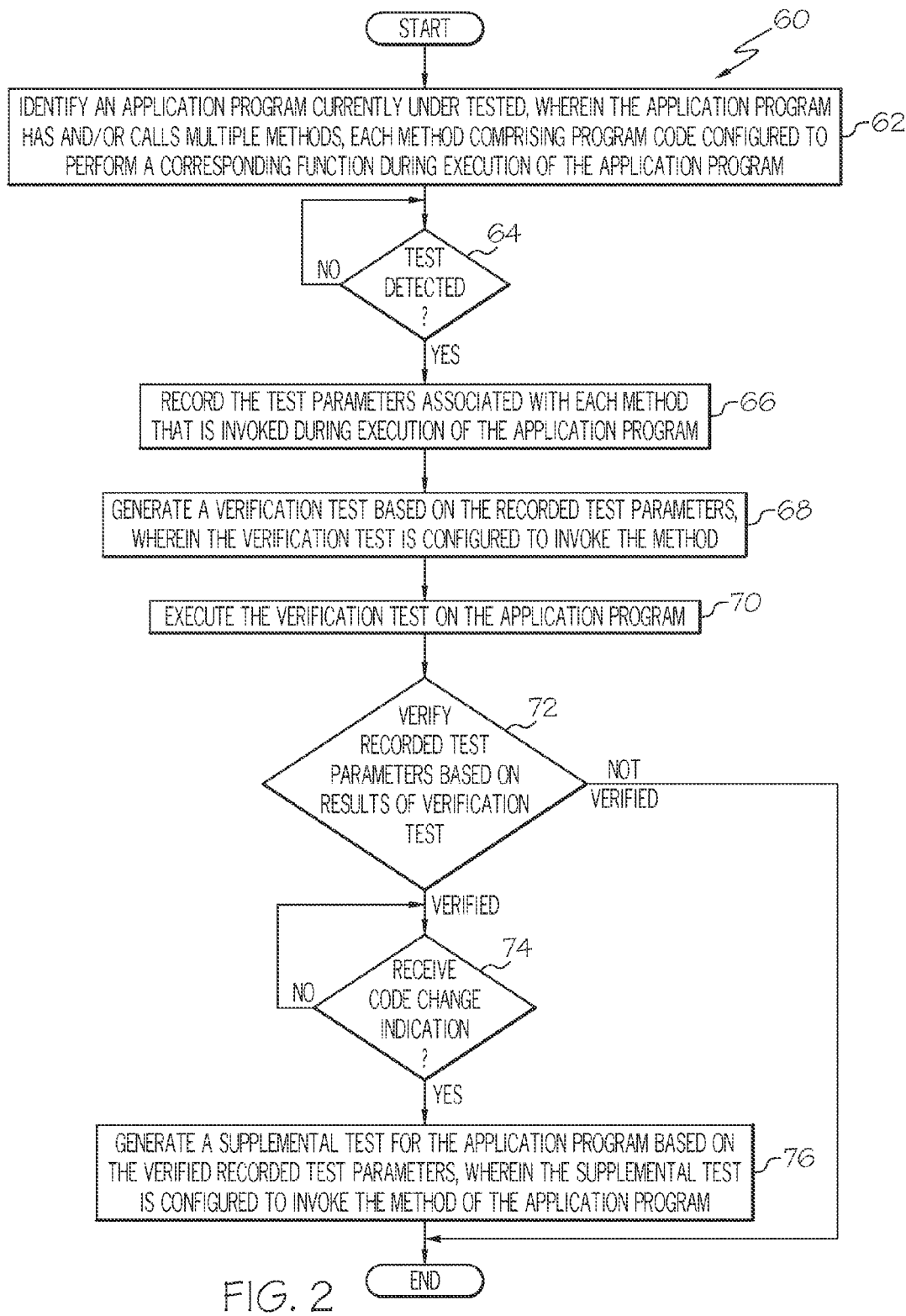
FIG. 2 is a flow diagram illustrating a method for generating tests for a software application according to one embodiment of the present disclosure.

FIG. 2 is a flow diagram illustrating a method 60 of automatically generating supplemental tests according to one embodiment of the present disclosure. These supplemental tests, as previously described, do not supplant or replace the tests that are normally run during the various types of testing, but rather, are automatically generated based on the parameters and results associated with those tests, and complement those tests.

As seen in FIG. 2, method 60 begins with the control computer 20 identifying an application program currently under test (box 62). By way of example only, the application program under test may be selected from a list of one or more tests by a user of control computer 20 using a Graphical User Interface (GUI), and reported to a control application performing method 60. Selection may occur, for example, when the user is preparing to execute a set of tests to test the functionality of the application program. Alternatively, or additionally, the application program under test may send a message to the control computer 20 indicating that it has been launched for execution.

Generally, the application program under test comprises a plurality of methods, some or all of which will communicate data with each other. The specific manner in which the methods are written, organized, or invoked is not germane to the present disclosure; however, for illustrative purposes only, the methods of the application program may be organized in classes included in the application program, in Dynamic Link Libraries (DLLs) and/or in APIs that are called or invoked by the application program during execution, or in any combination thereof. Regardless of the particular manner of organization, each method in the application program comprises program code—written in any programming language needed or desired—that when invoked, performs one or more specific functions.

Upon identifying the application program under test, method 60 waits to detect when a test is executed on the application program (box 64). For example, such detection may occur whenever the user initiates a test (e.g., issues a test command from the GUI on control computer 20), or whenever a test script associated with testing the application program is invoked. In some embodiments, the control computer 20 detects such testing responsive to receiving information and data from the application program as it is being tested. In these latter cases, which are described later in more detail, the methods of the application program, as are the methods of the DLLs and APIs that are called by the application program, are specially configured to intercept invocation calls to the methods, and in response, generate and send a message with a predefined set of information associated with that method back to the control computer 20. The message may include a specific indication of a test, or the receipt of the message itself may serve as that indication.

When the control computer 20 detects a test (box 64), control computer 20 is configured to obtain and record (i.e., store) a wide variety of information related to the test (box 66). For example, control computer 20 may record input and/or return parameter values of a method, one or more particular values utilized by the program code that defines the method, the data types for these values, a function signature, the call stack, the call order for the method, various identifiers, start/finish/elapsed time information for a method, exceptions generated by a method, and the like. Additionally, control computer 20 is also configured to generate other data, such as one or more IDs (e.g., unique test case identifiers), that may be utilized by the control computer 20 when automatically generating tests.

For example, control computer 20 generates verification tests based on the recorded test parameters (box 68). The verification tests are configured to invoke certain methods, and therefore, include the input parameters that were recorded for those methods. The verification tests are then executed on the application program to verify that the generated tests, and their associated parameters, are valid (box 70). To verify, one embodiment of the present disclosure captures the data that is output by the methods during the verification tests, and compares the captured data against the previously recorded output parameters for those methods (box 72). If the output parameters do not match, verification fails and the method ends. In some embodiments, a notification may be generated for the user to identify the verification test failure. However, if the output parameters do match (box 72), the verification test and the recorded data used in generating the verification test are considered verified.

For example, as stated above, embodiments of the present disclosure may be utilized in a complementary role to re-test certain portions of the application program whenever the code for the application program is changed by a developer. Thus, according to method 60, the control computer 20, which in this embodiment is operatively connected to a code repository at DB server 50, waits for an indication of a code change from the code repository (box 74). The indication may be in the form of a message, for example, that identifies the specific methods that were altered, added, or deleted by the developer. Upon receiving such an indication, control computer 20 uses this information to automatically generate one or more supplemental tests. The supplemental tests are generated based on the previously verified tests and associated parameters and information (box 76), and are generated to exercise each method that may be affected by the code modification regardless of whether the code of a particular method was actually modified.

For example, if a given method (e.g., METHOD "A") whose code has been altered by a developer invokes another method (e.g., METHOD "B") as part of its normal processing, the supplemental tests will be generated with the appropriate verified parameters to ensure that an execution path through both METHOD A and METHOD B is fully exercised, even though the program code for METHOD B may not have been modified. Similarly, if an API method (e.g., METHOD "C") is changed by the developer, the supplemental tests are generated with the appropriate verified parameters to ensure that each method in the application program that calls the API METHOD C is invoked, even though some or all of the methods in the application program may not have been changed. As described later in more detail, such generation is made possible by the type of information that is recorded for each method during their initial (and sometimes subsequent) testing phases.

Regardless of which tests are generated, however, the control computer 20 executes the supplemental tests on the application program and provides the results of those tests back to the user.

Figure 3A:
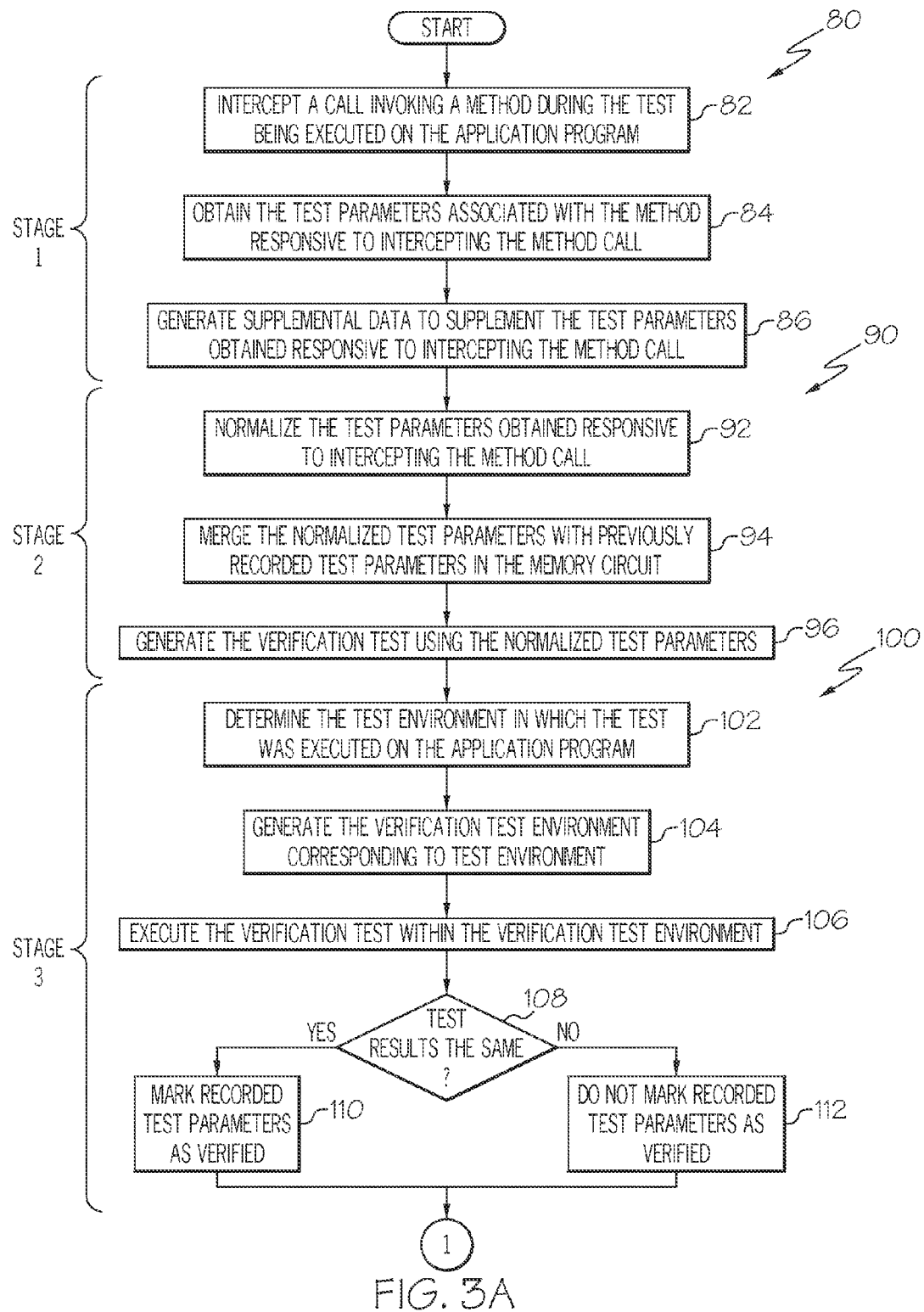
FIGS. 3A-3B show a multi-stage method for generating tests for a software application according to one embodiment of the present disclosure.
Figure 3B:
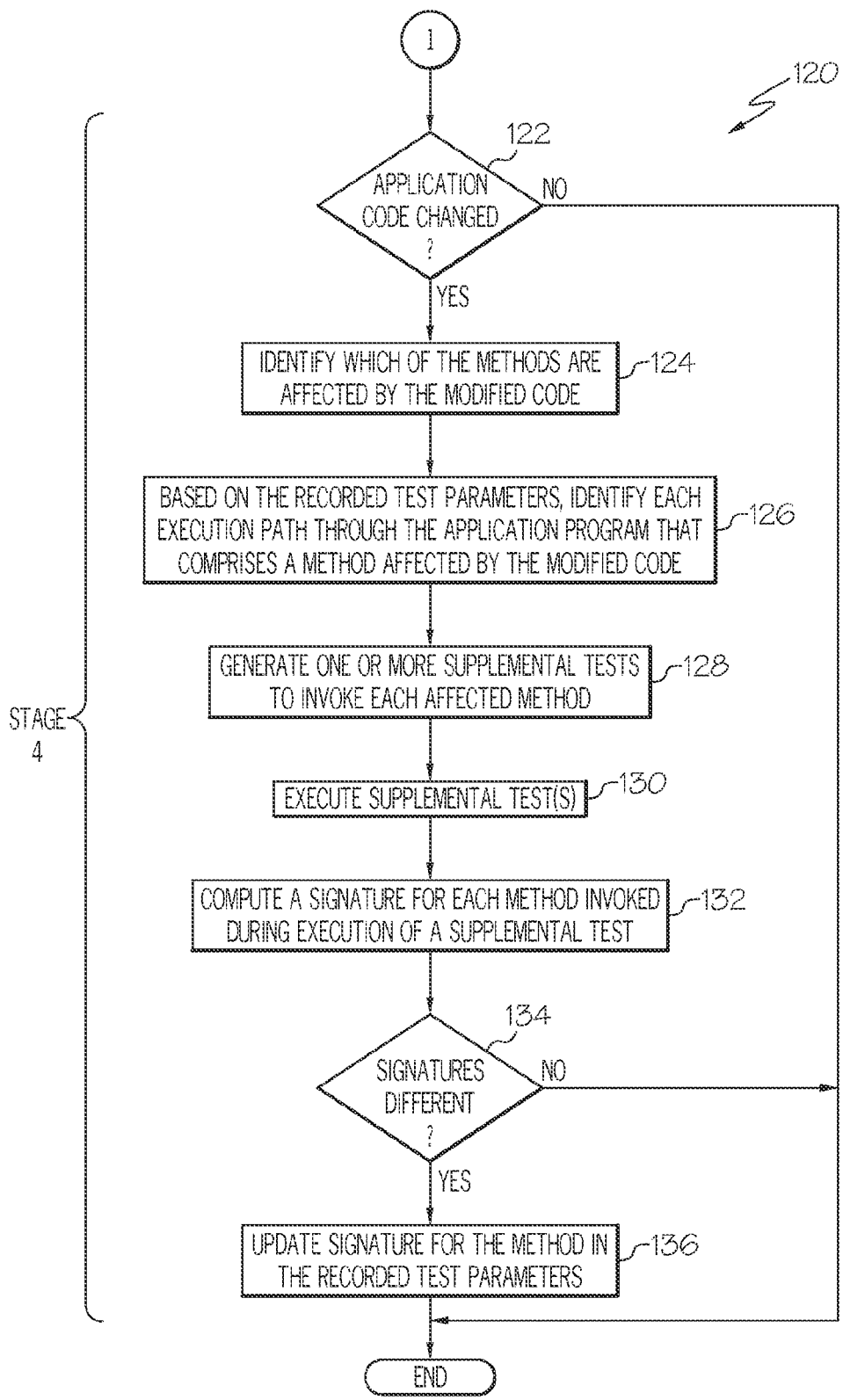

FIGS. 3A-3B illustrate a method 80 for performing the previous embodiment in more detail. It should be noted that FIGS. 3A-3G 3B assume that the application program under test has been identified and is executing on, for example, AS 40.

As seen in these figures, which is performed by a processing circuit in control computer 20, this embodiment of the present disclosure is performed as a multi-stage method.

The first stage is a "recording" stage 80 in which information and parameters associated with an initial round of testing are captured by control computer 20. The second stage is a "normalization" stage 90 in which the control computer 20 manipulates and/or associates certain data items to ensure that the information can be later used to generate supplemental tests. The third stage is a "verification" stage 100 in which the data and information captured and/or generated by control computer 20 during the recording and normalization stages is verified. The fourth stage is the "test generation" stage 120 in which the supplemental tests are generated and executed on the application program to regression test, for example, program code that has been changed and/or affected by a change in program code.

Beginning with FIG. 3A, the "recording" stage 80 begins with a intercepting a call to a method of application program under test (box 82), and in response, obtaining test parameters and other information associated with the execution of that method to the control computer 20 (box 84). For example, intercepting and obtaining this information and parameters according to embodiments of the present disclosure may be performed, for example, using Aspect Oriented Programming (AOP) techniques. In such cases, the methods of the application (as well as the methods of the APIs and DLLs, as needed or desired) are written using AOP techniques. This allows the methods to intercept invocation calls to the method, obtain the desired parameters and information, and then report them back to the control computer 20 in one or more messages.

In an embodiment in which the application program under test is written in JAVA, other mechanisms native to that platform may be used to intercept and report the parameters and information. For example, JAVA Beans may be "JSONified" using techniques well-known in the art. As another example, inbuilt classes and/or primitives may be serialized using some mechanism native to that language, as is known in the art.

Regardless of the particular method used to capture and report this information, the type of data and information that is obtained (i.e., described later with respect to FIGS. 5A-5E) may vary according to needs and desires. However, according to the present disclosure, the parameters and information obtained during the recording stage 80 include, but are not limited to, input and/or return parameter values for the method, one or more particular values utilized or processed by the method, the data types for these values, a function signature, the call stack, the call order for the method, as well as for other methods that it may invoke as part of its processing, various identifiers, start/finish/elapsed time information for the method, exceptions generated by the method, and the like.

In addition to the information and parameters obtained from the methods under test, control computer 20 is also configured to generate other data to supplement that information responsive to the method call being intercepted (box 86). By way of example only, control computer 20 may generate as one or more IDs (e.g., unique test case identifiers) and/or other data that will be utilized by control computer 20 in subsequent stages. Regardless of how the information is obtained, however, control computer 20 is configured to normalize and store the information in a memory circuit that is accessible to control computer 20 to facilitate its later use in generating both verification tests and supplemental tests.

In more detail, the "normalization" stage 90 normalizes the information and parameters obtained and generated during the "recording" stage 80 (box 92), and merges that data with other information and parameters that were previously captured, "normalized," and stored during other tests. In this context, "normalizing" means that the control computer 20 generates data, and/or alters the information and/or parameters obtained or generated during the recording stage 80 in such a way that it comports with the parameters and information captured and/or generated during tests that were previously executed on the methods of the application program. Such normalization, as seen in the framework of FIGS. 5A-5E, makes the parameters and information "usable" during the later verification and test generation stages 100, 120.

For example, with such "normalization," control computer 20 associates the information parameters obtained across multiple tests that may be conducted on application program over some extended period of time (e.g., months). In one embodiment, the present disclosure generates new information, manipulates existing information, or both, to be utilized as a key that links information across the framework. So associated, control computer 20 can determine which return values, for example, of one method are used as input parameters to another method. Such information will help control computer 20 to identify which tests to generate to ensure that each execution path through all affected methods is adequately exercised. Additionally, such association allows control computer 20 to accurately generate the verification and supplemental tests for the identified methods using the specific values and parameters that are expected to be received, output, and processed by those methods. Further, as described in more detail later, the work performed in the normalization stage 90 of the present disclosure facilitates the ability of the control computer 20 to perform the checks necessary to verify the methods being tested. Regardless of how the information and parameters are normalized, however, control computer 20 merges the normalized data with previously stored data (box 94) and generates the verification tests using the normalized parameters (box 96).

As seen in FIG. 3B, control computer 20 then enters the verification stage 100 in which it verifies the methods under test, as well as the information and parameters associated with those methods obtained during the recording stage 80. In this stage, control computer 20 first determines a test environment in which previous tests were executed on the application program (box 102). For example, the control computer 20 may utilize known techniques to obtain and store information about the execution environment of AS 40 at the time that the application program is being tested. Such information may include, but is not limited to, a number of threads that were utilized in executing the test during previous testing cycles, the IDs of those threads, memory constraints, resource constraints, and the like.

Once the test environment has been determined, control computer 20 generates one or more verification tests corresponding to the determined test environment (box 104), and automatically executes the generated verification tests within the test environment on the application program (box 106). Generating the verification tests according to the present disclosure may be done using any method known in the art. However, in one embodiment, control computer 20 uses the test identifiers generated and normalized in the previous stages 80, 90.

More specifically, the test identifiers are generated for, and associated with, corresponding methods. Based on these identifiers, control computer 20 can retrieve the particular parameters and information previously recorded and associated with that method from DB 52. Once retrieved, control computer 20 is configured to automatically generate and execute one or more test scripts, for example, to invoke the method with the appropriate parameters.

Methods are expected to return the same information and parameters as was recorded during previous successful tests. Therefore, one embodiment duplicates the test environment, parameters, etc., of a successful test, and captures the return values output by the method during the verification test. The newly-captured return values are then compared to the normalized return values that were captured and stored during one or more previously executed tests (box 108). Methods that return such expected values result in the verification test and its associated information as being "verified" (box 110) while those that do not result in the verification test and its associated information as being "unverified" (box 112). Only those tests and associated information that are marked as "verified" are able to be used by control computer 20 in the "test generation" stage when generating subsequent new tests for altered code.

In the test generation phase 120, control computer 20 is configured to automatically generate and load one or more subsequent tests, and then execute those tests to test the functions of the application program responsive to a coding change, for example. The test generation phase 120 occurs, for example, during regression testing, and may be generated to cover a large portion (or all) of the functionality of a given application program, or alternatively, only some targeted aspects of the application functions.

Regardless of what the generated tests cover, however, control computer 20 is configured to determine when the program code of an application program has changed, as well as which particular methods (i.e., procedures) that comprise the application program have been changed (box 122). As previously stated, the notification and information regarding any changes to the program code may be received, for example, from a code repository executing on DB server 50.

Upon receipt of the notification, control computer 20 identifies, based on the information received with the notification, which particular methods in the application program are affected by the code changes (box 124). Control computer 20 then identifies one or more execution paths through the application program for each identified method based on the recorded parameters and information (box 126).

According to the present disclosure, control computer 20 may identify multiple paths of execution through the application program, and then generate one or more supplementary tests designed to exercise each identified execution path (box 128). Further, any given test may invoke multiple methods along several execution paths. Thus, there may be, in some cases, coverage overlap between tests. However, in one embodiment, once control computer 20 identifies the method whose code has been changed, control computer 20 determines, based on the verified recorded information and parameters, the identities of each of the other methods that are invoked by the method whose code has been changed, if any. This may be accomplished, for example, utilizing data that associates the methods that are executed as part of the normal processing of the method whose code has changed.

Once the control computer 20 has generated the supplemental tests, control computer 20 automatically executes the supplemental tests to test the changed code, as well as the methods affected by the changed code, in the application program (box 130). Based on a comparison of the return parameters output by a particular method to the set of expected results for the particular method, as stated above, the results of the test will indicate whether the test passed or failed (box 132).

In more detail, the output of each test is captured in this stage, along with the output of the methods that are impacted during the execution of the supplementary test. As seen in FIG. 4, collecting this data allows control computer 20 to automatically identify which method failed, if any, and to present a user with data associated with the failed method. So informed the user can analyze the failure and determine how to address or correct the failure.

For example, consider an application program entitled "Calculator" having a method "calculate." The method "calculate" takes a string expression such as "1+3," and invokes two other methods. A first method "strToLong" accepts a string input (e.g., "1+3"), parses the string, and outputs corresponding long values (i.e., 1, 3). The second method—"add"—takes the two long values output by "strToLong" as input, sums the two long values, and then outputs the sum as a long value.

As seen in FIG. 4, the initial testing of the "calculate" method indicates that all methods passed a previous initial round of testing. However, upon regression testing, which as stated above may occur when the program code for the "calculate" method changes, the method "strToLong" is indicated as having failed. Thus, the user viewing these results can easily determine which particular method(s) failed regression tests, and further, focus investigations of the failure on the specifically identified method(s). In some cases, such as that seen in FIG. 5, the test results may also indicate the values of the input/output parameters used in the test, as well as identify the particular that was executed.

In addition, during the test generation stage 120, control computer will check to update the information and parameters for the methods invoked during the execution of the summary tests. To accomplish this, one embodiment of the present disclosure computes a signature for each method invoked during the execution of the supplementary test (box 132). For example, in one embodiment, the information and parameters associated with the method are input into a hash function. The resultant hash value can then be compared to a stored hash value for the method. If the hash values are the same (box 134), then the control computer 20 can determine that nothing has changed for the method under test. Otherwise, control computer 20 determines that either the code or the parameters of the method under test has changed, and thus, update the signature for the method in the recorded test parameters (box 136).

FIGS. 5A-5E illustrates the framework 140 of the present disclosure. In this embodiment, the framework 140 is represented by the data and information generated and/or obtained by control computer 20, as explained above. As seen in these figures, the tables of the framework 140 comprise a "SCENARIO" Table 142 that stores information related to various test scenarios generated by embodiments of the present disclosure, a "TEST CASE" Table 144 that stores data and information related to each of the test cases that are generated and verified by control computer 20, a "METHOD" Table 146 that stores information associated with each of the methods that are invoked during a test, a "PARAMETERS" Table 148 that stores information regarding the parameters of each of the methods in the METHOD Table 146, and an OBJECTS Table 150 that stores data and information regarding the objects that are processed by the tests generated for a particular method identified by METHOD_ID. Of course, other data tables and/or structures may be present as needed or desired.

In more detail, the data used to populate the SCENARIO Table 142 (FIG. 5A) is generated by the control computer 20 whenever a test scenario is initiated by a user. The tests in the scenario may be any type of test (e.g., unit, regression, system, QA, etc.), and are not limited solely to tests that are initially executed on the application program. Rather, as previously described, the data in this table may be updated based on the results of the supplemental tests.

As seen in FIG. 5A, the SCENARIO Table 142 comprises a SCENARIO ID field, which is automatically generated by control computer 20 to uniquely identify the testing scenario, and a SCENARIO NAME field, which is a string that identifies a name of the scenario. In addition, the SCENARIO Table 142 comprises a METHOD LIST array that stores the METHOD ID of each method invoked during the testing scenario. The METHOD IDs are stored in the array in the actual sequence in which they are invoked, and thus, may be utilized when generating supplemental tests to ensure that each method of an application program is fully tested regardless of whether the program code of that method was actually modified.

The TEST CASE Table 144 (FIG. 5B) stores data regarding each of the individual tests that are executed on the application program. This table comprises a TEST CASE ID that uniquely identifies the test, and a SCENARIO ID that links the test to a particular scenario. In this embodiment, the values for both of these fields are generated automatically by control computer 20 when the test is executed. Further, their values are used as keys that link the TEST CASE Table 144 to the other tables in the framework 140.

Regarding the other fields of TEST CASE Table 144, they contain information that is obtained by the control computer 20 during execution of the test. By way of example, control computer 20 may access the Operating System of AS 40 on which the application program is executing to request this information. Alternatively, the application program under test may be configured to obtain this information and return it to the control computer 50. Regardless, these fields may include, but are not limited to, a THREAD ID that identified the particular thread executing the test, the CALL STACK DEPTH, which indicates the depth of the call stack for the method identified by METHOD ID when the test is invoked, the INVOCATION TIME of the of the method (i.e., the time at which the method is invoked for execution), the RETURN time for the method (i.e., the time at which the method is finished executing), and the METHOD ID that uniquely identifies the method. Using simple calculations, the control computer 20 is fully configured to compute an elapsed time for the execution of the method identified by METHOD ID.

As seen in FIG. 5B, the TEST CASE Table 144 also stores a Boolean value, for example, that indicates whether the TEST CASE identified by TEST CASE ID, and its associated parameters and information, have been verified. As previously described, this field may be set based on the results of the verification test.

The METHOD Table 146 (FIG. 5C) stored the data that is relevant to the method identified by METHOD ID. By way of example, such data includes, but is not limited to, a CLASS ID that identifies a particular class for the method, the signature computed for the method, values for any EXCEPTIONS that are thrown by the method, and a RETURN VALUE(S) for the method. The RETURN VALUE may be used by control computer 20 when determining whether a given verification test has been verified, as previously described, and is also utilized as a foreign key into the OBJECTS Table 150.

The PARAMETERS Table 148 (FIG. 5D) stores data and information related to the parameters input into, output by, and/or processed by a method identified by METHOD ID. Each parameter is identified by a PARAMETER ID, and is included in the PARAMETER SEQ array, which stores the PARAMETER IDs in the sequence they are used during the test.

The OBJECTS Table 150 (FIG. 5E) stores data and information regarding any objects that are processed during the tests by the method identified by METHOD ID. The values for these fields are obtained by the control computer 20 during the test and include an OBJECT TYPE that identifies a type for the object. The fields also comprise a SAVED STATE, which a string representation of the object that may be used to re-created the object during one or both of verification and supplemental test generation. There are many known ways to obtain the SAVED STATE value; however, one embodiment performs a deep inspection of the object and generates a JSON document. Further, the fields also comprise an ORIGINAL OBJECT ID, which is an original ID for the object. In one embodiment, the ORIGINAL OBJECT ID is a memory address of the object, and is obtained by control computer 20 during the recording stage 80.

In addition to these fields, the OBJECTS Table 150 includes a COMPLETE flag and a NORMALIZED OBJECT ID. The COMPETE flag is a Boolean value that indicates whether the entire object identified by the NORMALIZED OBJECT ID has been saved in memory. If so, the control computer 20 need not generate the object for the test. The NORMALIZED OBJECT ID is a value generated during the normalization stage 80, and is used to identify and retrieve objects. For example, control computer 20 may generate the NORMALIZED OBJECT ID by concatenating the values of a plurality of fields. In one embodiment, the control computer 20 concatenates the SCENARIO ID with the SCENARIO NAME and the ORIGINAL OBJECT ID. However, other concatenations are also possible. NORMALIZED OBJECT ID is useful, for example, in determining whether the RETURN VALUE for the method identified by METHOD ID is used as an input parameter into another method.

Figure 6:
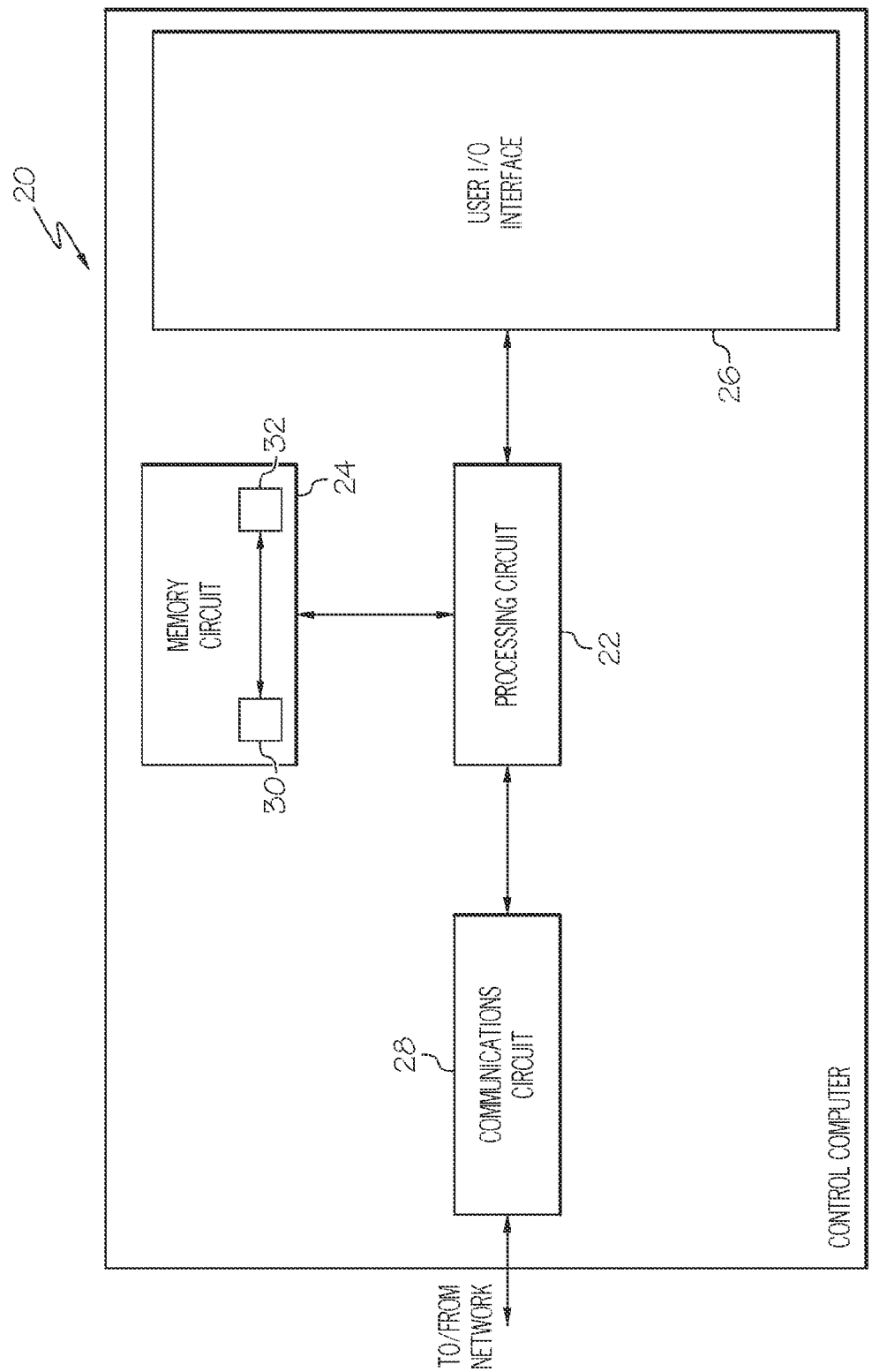
FIG. 6 is a functional block diagram of a computing device configured to generate tests for testing a software application according to one embodiment of the present disclosure.

FIG. 6 is a functional block diagram of control computer 20 configured to perform the embodiments of the present disclosure. As seen in FIG. 6, control computer 20 comprises, inter alia, a processing circuit 22, a memory circuit 24, a user Input/Output (I/O) interface 26, and a communications interface circuit 28. Those skilled in the art will readily appreciate that control computer 20 is not limited solely to the components seen in the figure, but rather, may comprise other hardware and/or software components as needed or desired.

Processing circuit 22 may be implemented by hardware circuitry comprising one or more microprocessors, hardware, firmware, or a combination thereof. Generally, processing circuit 22 controls the operation and functions of the control computer 20 according to appropriate standards. Such operations and functions include, but are not limited to, communicating with other network devices, such as one or more AS servers 40 and/or DB server 50 via network 12.

Additionally, according to various embodiments of the present disclosure, processing circuit 22 is configured to receive messages indicating that the program code of an application program has been modified, and in response, execute the instructions of a control application to perform the functions previously described. To that end, the processing circuit 22 may be configured to implement a control program 30 stored in memory circuit 24 that comprises the logic and instructions needed to perform embodiments of the present disclosure as previously described.

Memory circuit 24 may comprise any non-transitory, solid state memory or computer readable storage media known in the art. Suitable examples of such media include, but are not limited to, ROM, DRAM, Flash, or a device capable of reading computer-readable storage media, such as optical or magnetic storage media. Memory circuit 24 stores programs and instructions, such as the control program 30 previously mentioned, that configures the processing circuit 22 to perform the method of the present disclosure as described in the previous embodiments.

The user I/O interface 26 comprises the hardware and software components necessary for a user to interact with control computer 20. Such components include, but are not limited to, a display device that displays a GUI as previously described, a keyboard, a mouse, and any other input/output mechanisms that facilitate the generation and automatic execution of various tests according to embodiments of the present disclosure.

The communications interface circuit 28 may comprise, for example, an I/O card or other interface circuit configured to communicate data and information with AS server 40 and DB server 50 via network 12. As those of ordinary skill in the art will readily appreciate, the communications interface circuit 28 may communicate with these and other entities using any known protocol needed or desired. In one embodiment, however, communications interface circuit 28 sends data to and receives data from AS server 40 and DB server 50 in data packets according to the well-known ETHERNET protocol. In this regard, communications interface circuit 28 may comprise an ETHERNET card.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
identifying an application program under test, wherein the application program is associated with a plurality of methods, and wherein each method comprises program code configured to perform a corresponding function during execution of the application program;
responsive to detecting a test being executed on the application program, recording test parameters associated with a method that is invoked during the test in a memory circuit;
generating a verification test based on the recorded test parameters, wherein the verification test is configured to invoke the method;
executing the verification test on the application program;
verifying the recorded test parameters associated with the method based on data processed by the method invoked during the verification test; and
generating a supplemental test based on the recorded test parameters that have been verified responsive to detecting a change made to code in the application program, wherein the supplemental test is configured to invoke the method of the application program.

2. The computer-implemented method of claim 1 wherein recording test parameters associated with a method that is invoked during the test in a memory circuit comprises:
intercepting a method call invoking the method during the test being executed on the application program;
obtaining the test parameters associated with the method responsive to intercepting the method call; and
generating supplemental data to supplement the test parameters obtained responsive to intercepting the method call.

3. The computer-implemented method of claim 2 wherein recording test parameters associated with a method that is invoked during the test in a memory circuit further comprises:
normalizing the test parameters obtained responsive to intercepting the method call; and
merging the normalized test parameters with previously recorded test parameters in the memory circuit.

4. The computer-implemented method of claim 3 wherein normalizing the test parameters obtained responsive to intercepting the method call comprises altering a selected test parameter to incorporate the supplemental data.

5. The computer-implemented method of claim 3 wherein generating a verification test based on the recorded test parameters comprises generating the verification test using the normalized test parameters.

6. The computer-implemented method of claim 1 wherein executing the verification test on the application program comprises:
    determining a test environment in which the test was executed on the application program;
    generating a verification test environment corresponding to test environment; and
    executing the verification test within the verification test environment.

7. The computer-implemented method of claim 1 wherein the recorded test parameters comprise expected output data for the method, and wherein verifying the recorded test parameters associated with the method comprises:
    comparing return data output by the method during the verification test to the expected output data for the method in the recorded test parameters;
    verifying the recorded test parameters associated with the method if the return data output by the method during the verification test matches the expected output data for the method in the recorded test parameters.

8. The computer-implemented method of claim 1 further comprising:
    receiving an indication that the code of the application program has been modified; and
    identifying which of the plurality of methods associated with the application program are affected by the modified code responsive to receiving the indication.

9. The computer-implemented method of claim 8 wherein generating a supplemental test based on the recorded test parameters that have been verified responsive to detecting a change made to code in the application program comprises generating the supplemental test to invoke each affected method.

10. The computer-implemented method of claim 8 further comprising:
    identifying a plurality of execution paths through the application program based on the recorded test parameters, wherein each identified execution path comprises a method that is affected by the modified code; and
    wherein generating a supplemental test based on the recorded test parameters that have been verified responsive to detecting a change made to code in the application program comprises generating a corresponding supplemental test for each identified execution path.

11. The computer-implemented method of claim 1 wherein the recorded test parameters comprise a unique signature computed for the method, and further comprising:
    computing a test signature for the method invoked during the supplemental test;
    detecting whether the test signature is the same or different from the signature in the recorded test parameters; and
    replacing the signature in the recorded test parameters with the test signature if the computed test signature and the signature in the recorded test parameters are different.

12. A computing device comprising:
    a communications interface circuit configured to communicate with remote devices via a communications network; and
    a processing circuit operatively connected to the communications interface circuit and a memory circuit, and configured to:
        identify an application program under test, wherein the application program is associated with a plurality of methods, and wherein each method comprises program code configured to perform a corresponding function during execution of the application program;
        responsive to detecting a test being executed on the application program, record test parameters associated with a method that is invoked during the test;
        generate a verification test based on the recorded test parameters, wherein the verification test is configured to invoke the method;
        execute the verification test on the application program;
        verify the recorded test parameters associated with the method based on data processed by the method invoked during the verification test; and
        generate a supplemental test based on the recorded test parameters that have been verified responsive to detecting a change made to code in the application program, wherein the supplemental test is configured to invoke the method of the application program.

13. The computing device of claim 12 wherein to record the test parameters the processing circuit is configured to:
    intercept a method call invoking the method during the test being executed on the application program;
    obtain the test parameters associated with the method call responsive to intercepting the method call; and
    generate supplemental data to supplement the test parameters obtained responsive to intercepting the method call.

14. The computing device of claim 13 wherein the processing circuit is further configured to:
    normalize the test parameters obtained responsive to intercepting the method call;
    merge the normalized test parameters with previously recorded test parameters in the memory circuit.

15. The computing device of claim 14 wherein to normalize the test parameters, the processing circuit is configured to incorporate the supplemental data into a selected test parameter.

16. The computing device of claim 14 wherein the processing circuit is configured to generate the verification test using the normalized test parameters.

17. The computing device of claim 12 wherein to execute the verification test on the application program, the processing circuit is configured to:
    determine a test environment in which the test was executed on the application program;
    generate a verification test environment corresponding to test environment; and
    execute the verification test within the verification test environment.

18. The computing device of claim 12 wherein the recorded test parameters comprise expected output data for the method, and wherein to verify the recorded test parameters associated with the method, the processing circuit is configured to:
    compare return data output by the method during the verification test to the expected output data for the method in the recorded test parameters;
    verify the recorded test parameters associated with the method if the return data output by the method during the verification test matches the expected output data for the method in the recorded test parameters.

19. The computing device of claim 12 wherein the processing circuit is further configured to:
 receive an indication that the code of the application program has been modified; and
 identify which of the plurality of methods in the application program are affected by the modified code responsive to receiving the indication.

20. The computing device of claim 19 wherein the processing circuit is further configured to generate the supplemental test to invoke each affected method.

21. The computing device of claim 19 wherein the processing circuit is further configured to:
 identify a plurality of execution paths through the application program based on the recorded test parameters, wherein each identified execution path comprises a method that is affected by the modified code; and
 generate a corresponding supplemental test for each identified execution path.

22. The computing device of claim 12 wherein the recorded test parameters comprise a unique signature computed for the method, and wherein the processing circuit is further configured to:
 compute a test signature for the method invoked during the supplemental test;
 detect whether the test signature is the same or different from the signature in the recorded test parameters; and
 replace the signature in the recorded test parameters with the test signature if the computed test signature and the signature in the recorded test parameters are different.

23. A computer-readable storage medium comprising control instructions stored thereon that, when executed by a processing circuit of a computing device, control the computing device to:
 in a first stage:
  identify an application program under test, wherein the application program is associated with a plurality of methods, and wherein each method comprises program code configured to perform a corresponding function during execution of the application program;
  responsive to detecting a test being executed on the application program, record test parameters associated with a method that is invoked during the test;
 in a second stage:
  generate a verification test based on the recorded test parameters, wherein the verification test is configured to invoke the method;
  execute the verification test on the application program;
  verify the recorded test parameters associated with the method based on data processed by the method invoked during the verification test; and
 in a third stage:
  generate a supplemental test based on the recorded test parameters that have been verified responsive to detecting a change made to code in the application program, wherein the supplemental test is configured to invoke the method of the application program.

* * * * *